United States Patent [19]
Kanuma et al.

[11] Patent Number: 5,865,464
[45] Date of Patent: *Feb. 2, 1999

[54] AIR BAG

[75] Inventors: Tadao Kanuma, Kyoto; Yasunori Yuuki, Toyonaka; Tosio Isobe, Ishikawa-gun, all of Japan

[73] Assignee: Asahi Kasei Kogyo Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 682,766

[22] PCT Filed: Jan. 27, 1995

[86] PCT No.: PCT/JP95/00104

§ 371 Date: Jul. 29, 1996

§ 102(e) Date: Jul. 29, 1996

[87] PCT Pub. No.: WO95/20507

PCT Pub. Date: Aug. 3, 1995

[30] Foreign Application Priority Data

Jan. 28, 1994 [JP] Japan ......................................... 6-8734

[51] Int. Cl.⁶ .................................................. B60R 21/16
[52] U.S. Cl. ......................................................... 280/743.1
[58] Field of Search ................................ 280/743.1, 727; 383/3, 117; 428/35.2; 139/384 R

[56] References Cited

U.S. PATENT DOCUMENTS

| | | | |
|---|---|---|---|
| 5,114,180 | 5/1992 | Kami et al. | 280/743.1 |
| 5,178,408 | 1/1993 | Barrenscheen et al. | 280/728 |
| 5,193,847 | 3/1993 | Nakayama | 280/738 |
| 5,213,363 | 5/1993 | Fukumori et al. | 280/743.1 |
| 5,581,856 | 12/1996 | Krummheuer et al. | 26/18.5 |

FOREIGN PATENT DOCUMENTS

| | | |
|---|---|---|
| 3903216A1 | 8/1990 | Germany. |
| 4000740A1 | 7/1991 | Germany. |
| 4009611A1 | 10/1991 | Germany. |
| 4026374A1 | 10/1991 | Germany. |
| 4134837C2 | 4/1992 | Germany. |
| 4210965A1 | 10/1993 | Germany. |
| 3-16849 | 1/1991 | Japan. |
| 3-27146 | 2/1991 | Japan. |
| 3-287832 | 12/1991 | Japan. |
| 3-292235 | 12/1991 | Japan. |
| 4-143141 | 5/1992 | Japan. |
| 4-146233 | 5/1992 | Japan. |
| 4-209846 | 7/1992 | Japan. |
| 4-262937 | 9/1992 | Japan. |
| 5-93340 | 4/1993 | Japan. |
| 6-87394 | 3/1994 | Japan. |
| 6-306728 | 11/1994 | Japan. |
| 6-322637 | 11/1994 | Japan. |
| 6-341030 | 12/1994 | Japan. |

*Primary Examiner*—Christopher P. Ellis
*Attorney, Agent, or Firm*—Finnegan, Henderson, Farabow, Garrett & Dunner, L.L.P.

[57] ABSTRACT

An uncoated hollow weave air bag composed of a hollow weave fabric in which the circumferential periphery of the hollow part shaping the bag body is joined by a band of one layer bind weave, the hollow weave air bag satisfying the condition [1]–[3] below: [1] the weave constituting cloth A forming the hollow part of the bag body is a plain weave and the cover factor of cloth A being $2000 \leq K \leq 2300$, [2] the weave constituting cloth B which is the other cloth forming said hollow part, and the ratio of gas permeability at a pressure of 19.6 kpa for cloth B (qB) to that of cloth A (qA), qB/qA satisfies a relation $1 \leq qB/qA \leq 2.2$, [5] an opening (6) for attachment of the gas generator is provided in part of cloth B. The air bag of the present invention can be produced in a simplified manufacturing process and is light weight, less bulky and excellent in its safe inflation characteristics.

18 Claims, 9 Drawing Sheets

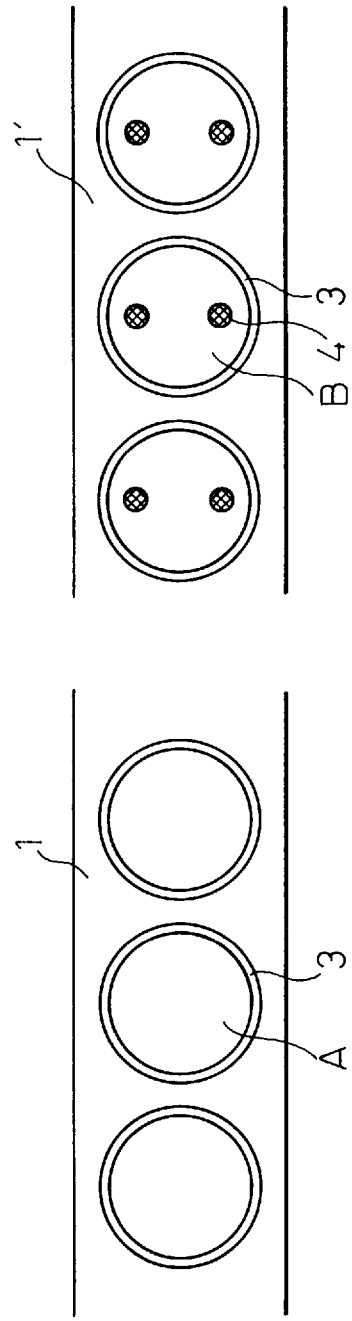

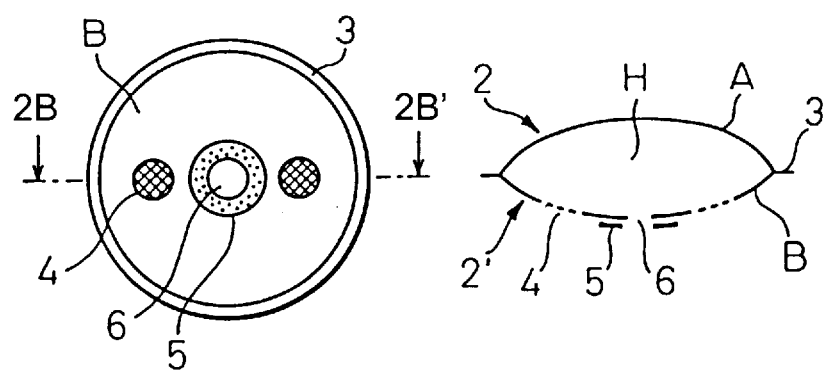

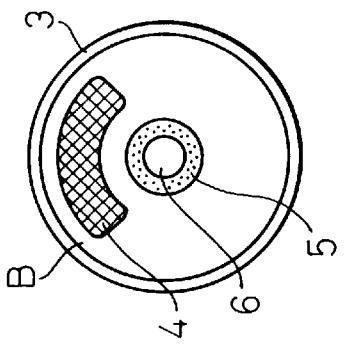
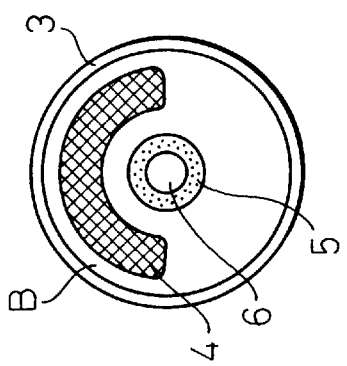
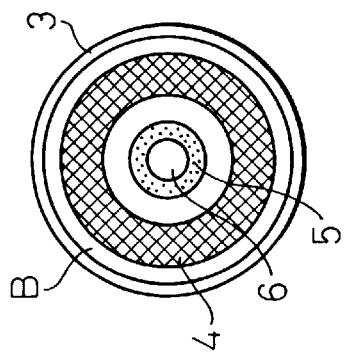
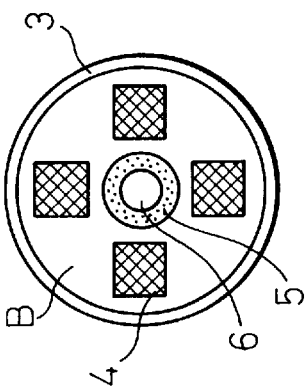
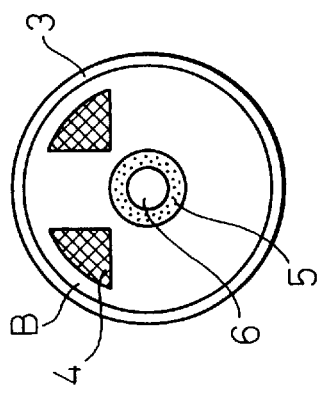

AIR BAG

TECHNICAL FIELD

This invention relates to an air bag for an apparatus for the protection of vehicle occupants in the event of a collision and relates to a light weight, compact and soft-to-the touch air bag made of a hollow weave fabric, which can be stowed, neatly and compactly, in an air bag casing.

BACKGROUND ART

A conventional sewn air bag is manufactured by sewing a plurality of given shaped cloths cut out of a woven fabric. It has been known that a hollow weave air bag can be made of a hollow weave fabric (so-called double weave fabric) through a manufacturing process in which the sewing work step for the circumferential seam formation can be eliminated. With elimination of the sewing work step, the proposed hollow weave air bag can be advantageously made without problems of the product reliability arising from manual sewing work in a conventional sewing made air bag manufacturing process, and can be supplied at a reduced price such that air bag apparatus is carried in wide variety of cars.

In Japanese Unexamined Patent Publication (Kokai) No. 1-254446 and U.S. Pat. No. 5,336,538, there are described coated air bags of a circular hollow weave fabric in which the circumferential periphery of the hollow portion is surrounded by a bind weave.

Air bags made of an bare fabric with no polymeric rubber coating have been developed with an attempt to obtain a light weight air bag which can be folded into a minimized shape.

In the patent specifications of Japanese Unexamined Patent Publication (Tokuhyo 4-504988 and WO 90/09295, uncoated circular hollow weave air bags made from a hollow weave fabric are described. In a currently known uncoated air bag, the fabric material is made in part more gas permeable so as to obtain a filtering effect for the discharge of inflating gas in the air bag, and the weave construction of the part is woven either in a lower weave density or in a more open weave such as a satin weave, twill weave and basket weave which have a more open weave construction.

The fabric material woven in a more open weave construction can assure the gas dischargeability required for an air bag. There are, however, some hazards encountered with use of a open weave construction; the vehicle occupant may suffer burns from the hot inflating gas which passes through an opened weave structure, or suffer eye injury due to the scattering residues contained in the hot gas. Since a base fabric of an open weave construction can be easily damaged by slippage of the weave structure, an air bag made from an open weave construction can be easily broken at its circumferential joined portion and the reinforced periphery edge of the opening for attachment of the gas generator when the air bag is deployed.

In Japanese Unexamined Patent Publication (Kokai) No. 3-128743 and U.S. Pat. No. 5,114,180, there are described examples of air bags in which the outer circumferential joined portion as well as the inner periphery portion around the hole for attachment of a gas generator are coated so that the afore-mentioned drawback can be eliminated. This method, however, needs an application of coating work and cannot make a light air bag with a soft hand in practice.

In Japanese Unexamined Patent Publication (Kokai) No. 2-158442, there is described a one piece air bag made of a hollow weave fabric in which the top side fabric facing the vehicle occupant and the bottom side fabric of the air bag have their respective own specific gas permeability range, qA and qB. However, the ratio of their gas permeability, qB/qA is greater than 2.5 which consequently may lead the air bag to fail to absorb of the impact energy of the vehicle occupant in the event of collision.

Furthermore, the circumferential joining portion of a hollow weave air bag is formed by two pieces of fabrics joined together by the bind weave (so called stitch weave) construction. Accordingly, the weave density in the bind weave is equal to the total number of woven yarns of the fabrics. As a result, the joining portion has such a very coarse and dense weave construction that could injure the vehicle occupant by abrasion when the air bag deploys at a very high speed. Because of this danger, the manufacture of air bags from a hollow weave fabric necessitates the turning inside out work step for making the joined potion to be placed inside of the bag body to obtain a ready to use form of the air bag. Naturally, the turning inside-out work is a factor raising the manufacturing cost of a hollow weave air bag.

DISCLOSURE OF THE INVENTION

The first object of the invention is to provide a light weight and soft uncoated air bag in which the hollow of the bag body is formed by a hollow weave (double weave) fabric of a selected weave constructions and weave density designed to prevent or minimize permeation of hot inflating gas which contains the residence particles of the gas generant.

The second object of the present invention is to provide an easily deployable uncoated hollow weave type air bag having sturdy characteristics and improved safety protection characteristics at a moment of its deployment.

The third object of the invention is to provide an uncoated air bag made of one piece fabric which can be manufactured directly by cutting out from a hollow weave fabric with the elimination of a turning inside out work step.

The first object of the present invention can be accomplished by an uncoated hollow weave air bag comprising;

a hollow weave fabric which is composed of two layers of cloths enclosing (confines) the hollow of the bag, the two layers of the cloths joined (or combined) together around the circumference of the hollow by a bind weave (stitch weave) band;

one of said layers constituting the cloth (herein after called cloth A) which confines the hollow on the side of the air bag facing the vehicle occupant;

the other remaining layer of cloth (herein after called cloth B) constituting the cloth (cloth B) which confines the hollow on the bottom side of the air bag; and the cloths A and B satisfy a relationship as represented below:

[1] the cloth A is a plain weave having a cover factor (K) as defined by the following formula, $$2{,}000 \leq K \leq 2{,}300$$

wherein
K=Kt+Kw
Kt=warp yarn density (end/in)×√denier of a warp yarn
Kw=weft yarn density (pick/in)×√denier of a weft yarn;

[2] the gas permeabilities qA and qB at 19.6 kPa for the cloths A and B have a relation represented below:

qA≦qB wherein the gas permeability of the cloth B represents the gas permeability of the cloth B excluding the weave of a vent hole portion.

In an air bag of the present invention, the cloth A which is to be in contact with the vehicle occupant has a dense weave construction through which it is hard to pass gases and particles in order to hold back the influence of the hot gas and particles on the vehicle occupant. Because of this, it is important that the cover factor of cloth A should be in a range of $2,000 \leq K \leq 2,300$, preferably in a range of $2,100 \leq K \leq 2,300$.

In general, a base cloth with low gas permeability can be prepared by weaving the cloth in an increased weave density. A weave for the cloth A should be a plain weave which can produce a weave construction having the greatest attainable density. A woven cloth of a kinds, such as for example a basket weave, a twill weave, a satin weave and rip stop weave, which have weave constructions which are less dense than a plain weave, cannot block out the hot inflating gas and particles scattered from the gas generator, even if it has a cover factor falling within the range of the present invention.

Referring to the gas permeability of cloths A and B, it is necessary, in order to ensure gas discharge performance of the air bag that the gas permeability (qA) of cloth A and the gas permeability (qB) of cloth B satisfy the relation $qA \leq qB$. In case of qB>qA is, the gas permeability of cloth A side which is to be contact the vehicle occupant contacts, there are concerns for a dangerous influence of the hot inflating gas on the vehicle occupant. Further, a ratio of qB to qA, i.e. qB/qA is preferably $1 \leq qB/qA \leq 2.2$. When qB/qA exceeds 2.2, the gas permeability on the side of cloth B becomes too high to protect the vehicle occupant against the impact of collision.

The gas permeability (qA) of cloth A should not be greater than 100 cc/cm$^2$/sec (at a pressure of 19.6 kPa). If the permeability of cloth A exceed 100 cc/cm$^2$/sec, the occupant of the vehicle may suffer burns from the escaping hot inflating gas passing through cloth A when the air bag deploys.

From a practical point of view, it has been found necessary that the permeating gas volume (Q) of an air bag of the invention is $1 \leq Q \leq 15$ m$^3$/min, preferably $2 \leq Q \leq 12$ m$^3$/min. If Q is less than 1 m$^3$/min, the discharge gas volume from the interior of an inflating air bag is so little when the occupant of the vehicle collides with the air bag that the occupant may rebound (recoil) in the reverse direction. If Q is greater than 15 m$^3$/min, the air bag at a moment of deployment will not increase its internal pressure enough to absorb the impact energy of collision against the occupant of the vehicle, and in consequence, there may be a danger that the body of the vehicle occupant may be thrown against the handle, panels fitted to the air bag or module where the air bag is stowed. The aforesaid permeating gas volume (Q) means the permeating gas volume flowing out from the whole structure of an air bag including the vent hole portions.

An uncoated hollow weave air bag of the present invention can be of any shape in accordance with the mode of application, for example a circular, oval, rectangular, or polygon shaped in plane form.

An air bag of the present invention, as herein after described, can be formed by cutting the outer periphery of the circumferential single layer bind weave band in a hollow weave (double weave) fabric obtained by weaving on a loom, and thereafter making an opening for the gas inlet passage in the layer of cloth (cloth B) laying on the reverse side of the drivers side cloth of the fabric in the hollow weave fabric.

In the air bag of the present invention, the hollow weave fabric is designed to form the hollow portion (the enclosed space) of a bag body in the aforesaid manner so that the prevention or minimization of the leaking of hot inflating gas and burnt particles from the inflating air bag, improved deployment characteristics and good stowability of air bag can be simultaneously attained.

The second and third object aimed for by the present invention can be attained by designing the weave constructions for cloths A and B and the single layer bind weave band according to the following various modifications as described hereinafter.

In one embodiment, an uncoated air bag is made from a hollow weave fabric in which weaving yarns for controlling the deployment of the air bag are incorporated in part with the yarns for weaving cloths A and B so as to link cloths A and B in the hollow weave structure. The linking yarns for controlling deployment of the air bag provides the air bag with a function equivalent to the tether or strap attached inside of the bag body of a conventional air bag.

A modified hollow weave air bag with a controlled deployment characteristics can be obtained by an air bag structure in which cloths A and B are linked or joined in part by either woven-in or sewn-in yarns which can be broken or elongate at a moment of deployment of the air bag.

In another example of this embodiment, the above structure can be a strap structure formed by woven-in yarns having a breaking strength sufficient to withstand at a moment of deployment of the air bag in which the yarns are woven so as to retain a fixed length inside the hollow of the air bag.

Another modified embodiment of the air bag is an uncoated air bag made of a hollow weave fabric in which a portion of cloth B is woven in a open mesh construction to form vent filter portions. The weave forming the vent filter portions is a more open construction than a plain weave for a positive discharge of the inflating gas. The number, weaving area and shape of the vent filter portions are determined in accordance with a gas dischargeability required for a specific air bag. The uncoated air bag of this modification can save the cutting and sewing work step through an air bag manufacturing process.

A still further modification of the air bag of the invention is an uncoated air bag made of a hollow weave fabric in which the outer periphery margin portion of the one layer bind weave band shaping the circumference of the hollow is woven to form an open and soft or pliable weave band having a stiffness factor value (S) of less than 28 as determined by the formula below:

$$S=N/(L \times U);$$

wherein N represents the sum of the warp and weft yarn density (number of yarn/inch in which number is represented by the number converted in terms of 420 denier yarn) of the weave band forming the outer periphery margin portion, L represents number of woven layer forming the outer periphery margin portion, and U represents the total numbers of warp yarns and weft yarns in one weave repeat forming the weave band of the outer periphery margin portion.

For example, when cloths A and B are woven from 420 denier yarns in the respective warp and weft density of 53 ends and 53 picks/inch, the weave density in the single layered bind weave will be 106 yarns/inch, that is N=212 yarns/inch; when cloths A and B are woven from 210 denier yarn in a weaving density of 72 ends and 72 picks/inch, the weaving density of the single layer bind weave band, N will be 144 yarns/inch in a similar manner. As exemplified above, the greater the value N becomes, the higher the weave density of a fabric and, as a matter of fact, the hardness factor value S becomes greater.

L stands for number of the layers; when N is the same, the greater the value of L becomes, namely the greater the number of layer becomes, the weave density per layer of a fabric becomes small. Accordingly, the fabric becomes soft and the proper course to take is a smaller value of S.

U stands for the sum total of number of the warp and weft yarns constituting the least repeating unit of a weave construction. For examples in the case of a plain weave, U equals 4, and in the case of 2/2 hopsack weave, U equals 8. As a value of U increases, namely the smallest repeating unit of a weave construction becomes greater, the more open the weave construction becomes more open. In consequence, the fabric becomes soft as a value of S becomes smaller. Therefore, a fabric becomes harder with an increase of S and a fabric with a smaller S becomes soft.

When a value of S for the outer periphery margin portion is no smaller than 28, the edge of the cut out piece becomes so stiff that the vehicle occupant may suffer injury by abrasion in the face or arm when the occupant collides with the inflating air bag. In order to avoid any incidence of the abrasive injury, a preferred value S is no greater than 28.

Since the one layer bind weave band is bordered with a soft and open weave margin at the its outmost end as in a manner explained above, the cut end portion of the one layer bind weave band can be soft or pliable to the touch.

Thereby, an uncoated air bag in accordance with the present invention can be an uncoated air bag readily usable as it is cut out from a hollow weave fabric along the periphery of the one layer bind weave band. Of course, there is no need to turn inside-out work during the manufacture. Therefore, the present invention enables a extremely simple air bag manufacturing process, which is naturally economical.

For weaving of the hollow weave fabric (double weave fabric), it is preferable to use a loom provided with powerful beating which is suitable for weaving relatively high weave density fabric. A suitable loom can be selected from rapier, projectile, shuttle, air-jet looms and the like. For weaving a hollow weave fabric, a jacquard device can be used. A jacquard device can be either mechanical, or electronic. The warp yarn supply to a loom can be made by a warping system including a plurality of warping beam. In case where yarns for controlling the deployment of an air bag is incorporated (woven-in) in part in cloth A or B as part of the warp ends, the yarn can be furnished onto the loom from separate warp beams. The yarns for constituting cloth A or B of the invention can be selected in accordance with the characteristics required by a type or design of an air bag.

For cloth A, a high density weave or tight weave fabric, i.e. plain weave fabric having a high cover factor, is used to obtain a low gas permeable fabric. An appropriate yarn count or size is no greater than 750 denier, preferably no greater than 600 denier in which the denier of a single filament constituting a yarn is 1–6, preferably 2–4. The size of the yarn are selected in order to avoid any incidence of fabric defects such like increased basis of weight, decreased pliability and deterioration of tearing strength which might be encountered in a high density fabric weaving.

On the other hand, cloth B which should have an appropriately controlled gas permeability, though it may be woven with use of the same kinds of yarn, weave construction and weaving density as those used in weaving cloth A, can be prepared either by weaving a fabric with a smaller cover factor with the use of yarns of smaller yarn counts, or by weaving a fabric in a more open or slackened weave construction other than a plain weave, for examples a basket weave (a mat weave) and a rip stop weave and the like. It is an extremely efficient method that the gas discharge characteristics of air bag is adjusted by changing area of the provision of a more opened weave part for the vent filter portions in the plane area of cloth B.

Yarns for forming cloths A and B can be selected from yarns conventionally available including, for example fibers from polyamides such as nylon 6, nylon 66, nylon 46, copolyamides of these nylons or blended composite of these polyamides; fibers from polyesters such as polyethyleneterephthalate, polybutyleneterephthalate, polyethylenenaphthalate copolymer of thereof, or polymeric blend thereof; fibers from aramid such as poly-para-phenyleneterephthalamide and copolymer of aromatic ether with thereof; wholly aromatic polyester fiber: vinylon fiber; fibers from polyolefins including super high molecular weight polyethylenes; fibers from polymeric vinylchlorides or polymeric vinylidenechlorides fibers; fibers from polymeric fluoro fibers such as fluoroethylenes; polysulfone fiber (PS); polyphenylenesulfide fiber (PPS); polyetheretherketone fiber (PEEK); polyimide fibers; polyetherimide fibers; cellulose fibers including high tenacity rayon; acrylic fibers; carbon fiber; glass fiber; siliconecarbide (SiC) fibers; alumina fibers. In case of need, yarn can be of inorganic fibers typically exemplified by steel fibers.

These fibers can be of fiber containing various kinds of additives which are commonly used for modifying the fiber material on durability, processability, or spinabitlity of fiber; for examples heat stabilizer, antioxidant, light stabilizer, aging retarder, lubricant, smooth finishing agent, pigments, water-repellent, oil-repellent, opacifying agents such as titanium oxides, lustering agent, fire retardant, plasticizer and the like. These additives can be used singly or in combination. When needed, the yarns can be texturized form such as twisted yarns, bulked yarns, crimped yarns covered yarns and the like. Further, the yarn can be filamentary yarn, spun yarn of staple fibers and composite of these yarns and is not specifically limited in the present invention.

BRIEF DESCRIPTION OF THE DRAWINGS

FIG. 1(A) through FIG. 1(B) illustrate an example of hollow weave fabric as used for the base cloth of a hollow weave air bag of the present invention. FIG. 1(A) is a plan view of a hollow weave fabric as seen from cloth A side. FIG. 1(B) is a plan view of the hollow weave fabric as seen from cloth B side.

FIG. 2(A) through FIG. 2(B) illustrate an uncoated air bag of the present invention. FIG. 2(A) shows a plan view of cloth B side of the air bag which is placed on the backside (bottom side) of cloth A facing towards the vehicle occupant. FIG. 2(B) shows a sectional view taken on lines 2B—2B in FIG. 2(A).

FIG. 3(A), FIG. 3(B), FIG. 3(C), FIG. 3(D) and FIG. 3(E) illustrate shape variations of the vent filter portions in the hollow weave air bags of the present invention in plan view. A vent filter portion shown in FIG. 3(A) is a ring shape; in FIG. 3(B), a ½ ring shape; in FIG. 3(C), a ¼ ring shape; in FIG. 3(D), a fan shape; and in FIG. 3(E), a rectangle shape.

FIG. 9(A) shows a plan view of cloth A side of the air bag and FIG. 9(B) shows a plan view of cloth A side of the air bag.

FIG. 14(A) illustrates the top view of the deployment testing apparatus. FIG. 14(B) illustrates the apparatus as viewed from X in FIG. 14(A). FIG. 14(C) illustrates the apparatus as viewed from Y in FIG. 14(A).

BEST MODE OF CARRYING OUT THE INVENTION

Figure 4:
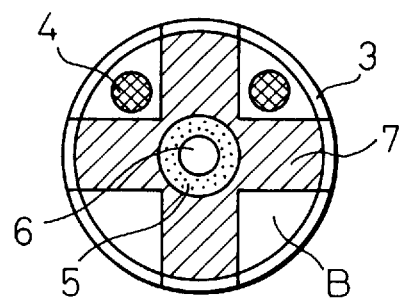
FIG. 4 illustrates variations of cloth B of a hollow weave air bag of the present invention in which cloth B is provided with a cross pattern shaped reinforcing weave formed by incorporated additional weaving yarns.

An uncoated hollow weave air bag in accordance with the present invention will now be described mainly as an aspect of an air bag for a driver's seat referring to FIG. 1(A) through FIG. 11.

FIG. 2(A) and FIG. 2(B) show a typical example of an uncoated hollow weave air bag of the present invention as applied to an air bag for the driver's seat. FIG. 2(A) is a plan view showing the bottom face of the air bag, namely the face opposite to the vehicle occupant. FIG. 2(B) shows schematically a cross section of the air bag body with the hollow being inflated somewhat exaggerated. In this example, the uncoated air bag is formed by a hollow weave (double weave) fabric consisting of two pieces in composite of cloth (A) arranged in the driver side (2) and cloth (B) arranged in the side on the opposite (2') to the driver side (bottom side) in which cloth (A) and cloth (B) are joined together around the circumference of the enclosed circular hollow (H) of the bag body. Cloth (A) is a plain weave fabric having a cover factor of from 2,000 to 2,300 and is a nearly gas impermeable plain weave fabric having a gas permeability (qA) of not greater than 100 cc/cm$^3$/sec. Cloth A is typically a fabric woven from nylon 66 or polyester filaments yarn having a yarn count of 420 denier/140 filaments.

Cloth (B), which makes up the bottom side of the hollow portion of the bag, namely the fabric arranged on the steering wheel side of the air bag body in the case of driver's seat air bag as mentioned in this example, is a woven fabric having a greater gas permeability characteristic than that of cloth (A). Cloth (B) is made by weaving from yarns of the same fiber material as cloth (A). Cloth (B) is, further, provided with two vent filter portions formed in an more open or mesh like weave construction on both sides of an opening (6) cut out for attachment of the gas generator.

On the outer periphery area of the opening for attachment of the gas generator (as the gas inlet) in cloth (B), a reinforcing fabric piece, to which the gas generator (not shown) is mounted, is fixedly bonded by an adhesive.

The uncoated hollow weave air bag illustrated in FIGS. 2(A) through 2(B) is produced from a fabric (1) provided with a plurality of a hollow weave patterns in array along the length of a fabric as shown in FIG. 1(A) through 1(B).

The respective hollow weave patterns are separated from the fabric by cutting around the outer periphery of the one layered bind weave band (3) of the hollow weave pattern by means of laser or heat knife to obtain respective pieces of the bag bodies. The afore-mentioned opening (6) for attachment of the gas generator is formed by cutting with a laser or the like. FIG. 1(A) shows the cloth A side of the fabric (1). FIG. 1(B) shows the bottom side cloth of the fabric (1) making up cloth (B).

FIG. 3(A), FIG. 3(B), FIG. 3(C), FIG. 3(D) and FIG. 3(E) show variations of vent filter portions (vent hole having filter function) of a open meshed weave provided in part of cloth B. Provision of the vent filter portion (4) is effective in practical utility. It is necessary that the vent filter portion has a function enabling the gas discharge or exhaust within a extremely short second of from about several tens to several hundreds of milli-seconds immediately after the vehicle occupant collides with the air bag during its deployment. Accordingly, it is effectual that a weave construction for the vent filter portion is preferred to be more open structured than that for cloth (B). A magnitude of gas permeability for the vent filter portion (4) is preferably at least 3 times greater than that for cloth (B). For weaving a vent filter portion (4), a weave having a more open weave structure than a plain weave, such as a basket weave, a twill weave, a satin weave, a rip stop weave, a mock leno weave, a warp rib weave, a weft rib weave and the like can be used. Other conditions for forming a vent filter portion such as area, shape and the number of portions the can be optionally determined in conformity with a required characteristics of gas discharge of a specific air bag.

Figure 6:
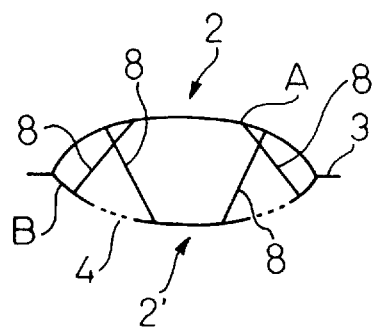
FIG. 6 illustrates schematically a cross section of an air bag of the present invention in which linking yarns are woven into the weaves construction forming cloths A and B so as to link cloth A with cloth B in part.

It is desirable that an uncoated air bag of the present invention is provided with straps for controlling the shape of its deployment. In the present invention, equipment of the straps are preferably made by either one of the following methods:

[1] Linking yarns (8) for controlling the inflation of the air bag are woven-in in addition to the main weaving yarn constituting cloths (A) and (B) so as to form loose or slack linkings between cloths (A) and (B) at a selected area (2') as shown in FIG. 6 at the time when the air bag is woven.

Figure 7:
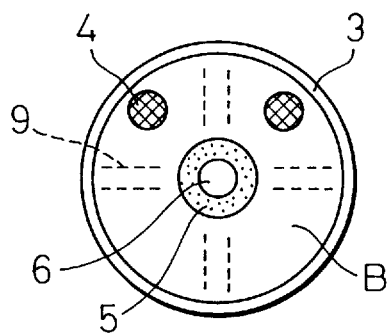
FIG. 7 is a plan view illustrating a hollow weave air bag as viewed from cloth B side in which a binding yarns are sewn into seams so as to connect cloths A and B on top of the other in part in close contact.

[2] Joining yarns (9) for controlling the inflation of the air bag connect partially cloth (A) with (B) as showing in FIG. 7 so that the joining yarns (9) are broken or elongated to absorb a protruding energy of the bag at a moment when the air bag is inflating. The joining of cloth (A) with cloth (B) can be made by weaving-in or sewing of the joining yarns.

Linking yarn (8) and joining yarn (9) can be of any material, size, tenacity and the like as far as these conditions can effect a satisfactory prevention of protrusion of air bag.

Linking yarn (8) or joining yarn (9) can be woven-in or sewn-in in any number as required to obtain a desirable controlled inflation in warp-wise and/or weft-wise direction. In method [1], linking yarn (8) which are woven-in, for example high tenacity and heat resistant fiber yarns such as aramid fibers, are inserted in a selected length into the hollow of a bag body by weaving so that a height of deployment of the air bag at its inflation is lower by 20% or more than that of an air bag without straps. For methods for inserting the linking yarn, currently known method as described in Japanese Unexamined Patent Publication (Tokuhyo) No. 4-504988 (WO 90-09295) may be applied.

For linking yarns (8), a high elongation yarn may be used as well. With use of a high elongation yarn, extrusion of inflating air bag can be restricted, since the straps of high elongation yarns can moderate impact load on the straps, thus not breaking when the air bag deploys. The straps of high-elongation can absorb the deployment energy of an air bag to some extent while they elongate.

A high elongation yarn can be, for example, a bulked textured yarn or crimped textured yarn having an elongation at break of 200% or more, preferably 300% or more. High elongation yarn can be an undrawn yarn, for example polyamide undrawn yarn of which an elongation at break is 200% or more, preferably 300% or more and of which a size of the undrawn yarn ranges from 2,000–8,000 d.

A joining yarn (9) used in method [2] control the thrusting forward movement of the air bag by making use of the breaking energy of the yarns generated at the moment when the air bag deploys in the similar manner as described in Japanese Unexamined Patent Publication (TOKUHYO) No. 4-504988 (WO 90-09295). Therefore the joining yarn (9) must be broken at a moment when the air bag inflates. It is preferable that cloth A and cloth B are joined radially starting from the area of gas inlet hole towards the outer periphery of the air bag by relatively low tenacity yarns. It is necessary that the conditions of joining yarn such as tenacity, length, number of joining points should be selected as required in conformity with the gas output of a specific gas generator in order to obtain a prescribed restraint effect of the protrusion of air bag.

Figure 11:
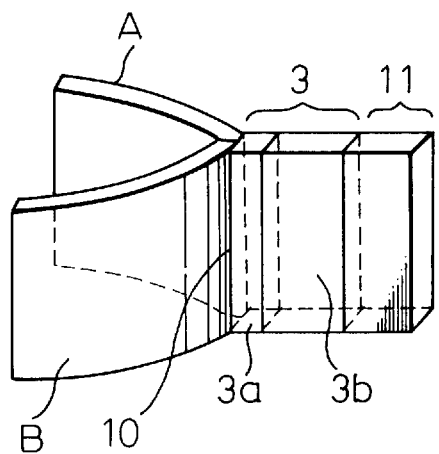
FIG. 11 is a bird eye view figure illustrating a partial structure of a hollow weave fabric provided with a hollow weave part, the single layer bind weave band and the outer periphery margin portion.

FIG. 11 illustrates that the single layer bind weave band (3) defining the circumference of the hollow of an uncoated air bag of the present invention is further surrounded by an outermost periphery margin portion (11) having a stiffness factor value of 28 or less. It is preferable that the uncoated air bag illustrated in FIGS. 2(A) and 2(B) is designed to have the pliable outermost periphery margin portion (11), though this embodiment is not shown in these figures.

The weave of the single layered bind weave band (3) which defines a shape of the hollow is designed to make a slip resistant weave in the boundary region between of cloth A or cloth B and the circumferential one layer bind weave band (3). Therefore, it is preferred that the weave construction of the single layered bind weave band (3) is woven as tightly as possible. Further, the single layer bind weave band (3) should have some width to a certain degree. At greater weave densities of cloth A and cloth B, the width of the single layer bind weave band (3) will affect the weavability and quality of the one layer bind weave band (3) which will give rise to problems in weaving the hollow weave fabric.

Prevention of slippage of weave structure in the single layered bind weave band (3) as well as improvement of quality of the band can be attained, for example, by providing two areas (3a) and (3b) which are formed by dividing the single layered bind weave band (3) in crosswise direction. Area (3a) abutting on the hollow of the air bag is woven relatively narrow in a weave as dense as possible such as a plain, or rib weave and the like. The area (3b) is woven on the outside of the area (3a) relatively wide so as to form a relatively open weave structure such as a mat weave, twill weave and the like. The width of areas (3a) and (3b) may be 1–5 mm and 6–25 mm respectively.

Further, in order to manufacture the hollow weave air bag with elimination of the turning inside-out work step, the outer periphery end of the one layer bind weave band should be soft to hand or pliable. Though single layer bind weave band (3) or (3b) can be made soft by providing a more open weave, the one layer bind weave band should not be excessively open because of the aforesaid weave slippage problems occurring in the vicinity of the circumference of the hollow.

In a more preferred alternative embodiment of the present invention, an outer periphery margin portion (11) with a soft or pliable structure may be provided in the outmost end of the single layer bind weave band (3), while the single layer bind weave band (3) is woven in a strong weave structure.

With the circumferential one layer bind weave band (3) designed as explained above, incidence of scratch injury to the vehicle occupant as well as slippage of weave structure within the periphery weave seam can be prevented simultaneously.

The single layer bind weave band (3) should be of single layer. The circumferential band (11) is not necessarily single layer weave structure. It can be multi-layer weave such as double weave to triple layered weave. When a multi-layer weave structure is utilized, a more pliable weave structure can be obtained by lowering weaving density per layer of the weave. It can be effectual that the outer periphery margin portion (11) may be constructed by a multi-layer weave structure of a more open weave.

FIG. 4, FIG. 5, FIG. 8 and FIG. 9(B) show several variations of cloth B in which a reinforcing weave structure (7) is formed around the gas inlet opening. The reinforcing weave structure is provided with enough width to enclose the opening (6) for attachment of the gas generator, and is woven from warp and weft yarns separately supplied from yarns constituting the main body of cloth B.

The reinforcing weave structure is formed by weaving over an area where separately supplied warp and weft yarns interlace with each other. In case where opening (6) for attachment of gas generator is a circular shape having a diameter of 100 mm, the width of reinforcing weaving for warp and weft yarns may be 150–300 mm.

The reinforcing weave can be a weave structure having a higher density increased by the number of added extra yarns integrally woven into cloth B. It can also be a weave woven only from yarns separate from the yarn for weaving cloth B and stitched to cloth B intermittently at selected area around the circumference portion of the opening (6) for attachment of the gas generator.

Number of weaving yarn, weave construction, and reinforcing structure can be designed to suit the optimum requirement considering the balance between a required tenacity of yarn and the weaving characteristics of the yarn. For weaving a reinforcing weave, the same yarns as used for weaving cloth B can be used. Use of a high strength yarn, for example a yarn having a tenacity of 10 g/d or more can enhance reinforcing effect of the reinforcing weave. Use of twisted or sized yarn can be used for prevention of trouble in the weaving operation.

Figure 5:
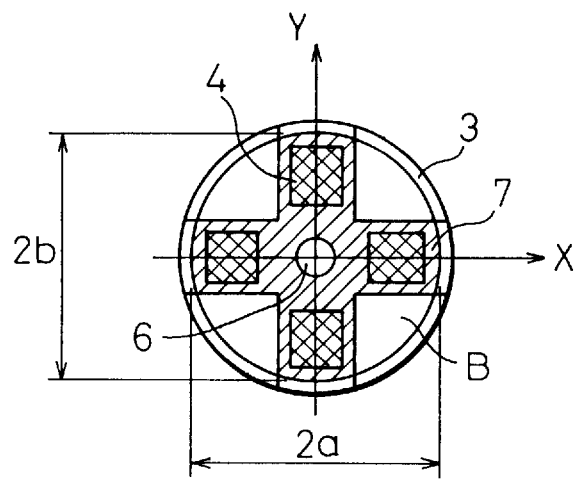
FIG. 5 illustrates another example of the hollow weave air bag of the present invention in which cloth B is further provided with vent filter portions within a cross pattern shaped reinforcing weave formed by the incorporation of additional yarns.
Figure 9A:
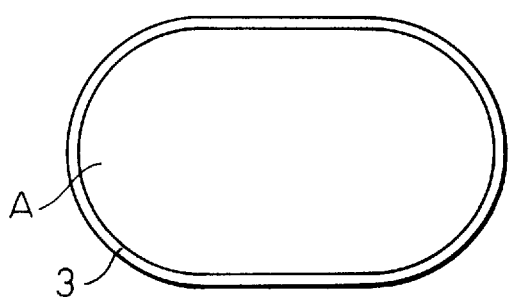
FIG. 9(A) through FIG. 9(B) illustrate a hollow weave air bag for protection of the passenger's seat occupant in accordance with the present invention.
Figure 9B:
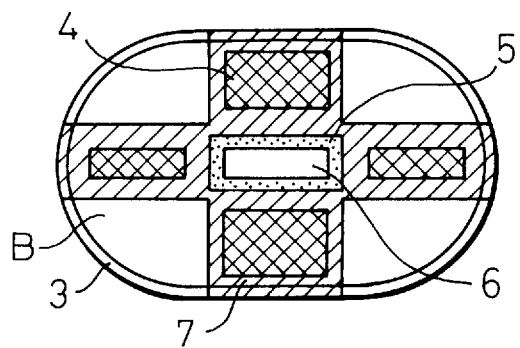

In alternative examples shown by FIG. 4 and FIG. 9(B), an added reinforcing cloth piece (5) is adhesively bonded to the reinforcing weave structure (7). In the case where an air bag is used in combination with a relatively high powered gas generator or a high temperature gas effusing generator, it may happen that the vent filter portion (4) is damaged, or in some cases fused by the gas at such an elevated temperature. Accordingly, it is advantageous that the vent filter portions are placed in the reinforcing weave region (7) as shown by FIG. 5. In this manner, the heat capacity of the vent filter portion becomes greater since the total denier (TD) of the warp and weft yarns constituting a vent filter portions per unit area is increased, and the damages of the vent filter portions can thereby be prevented. In order to obtain the advantageous result, it is essential that a ratio (TD/TD') of said TD to the total denier (TD') of the warp and weft yarns constituting cloth B excluding the vent hole portions is determined in a range $1.5 \leq TD/TD' \leq 4$, preferably $1.8 \leq TD/TD' \leq 3.5$. When TD/TD' is less than 1.5, the heat capacity is small so that there may be some risk of fusing or melting of the vent filter portions. When TD/TD' exceeds 4, the gas permeability of the vent filter portions becomes excessively small so that the function of the vent filter portion is lowered even if the weave construction of the vent filter portion is made as open as possible.

When an enhanced heat-resistance characteristic is required in the vent filter portions, the requirement can be fulfilled by selection of a position of vent filter portions. Referring to FIG. 5, the vent filter portions (4) are equipped at positions satisfying $-a \leq x \leq a$ and $-b \leq y \leq b$ in a rectangular coordinate diagram in which the origin of the coordinates represents the geometrical center point of cloth B, X axis represents the direction of the weft yarn, Y axis represents the direction of the warp yarn, 2a represents the width of cloth A in the direction of the weft yarn, and 2b represents the width of cloth B in the direction of the warp end. Since an arrangements at a position outside of these ranges makes cloth B easy to elongate greatly, the shape deformation of the vent filter portions becomes greater at a moment of the air bag deployment. This leads to result in localized formations of portions having a greater gas permeability where the discharge of the hot gas is concentrated. In consequence, there is a risk of incidence of melting or fusing vent filter portions in case where an air bag apparatus is used in combination with a gas generator generating an extremely hot gas.

The circumferential area of the opening (6) for retaining the gas generator is attached fixedly with a separately prepared reinforcing cloth piece (5) as shown in FIG. 2(A) or FIG. 4. This is because an extremely great impact force is imposed on this area at the initiation of deployment of air bag during which air bag is pushed forward from the module. In a known reinforcing method, a plurality of reinforcing cloth pieces, for example circular shaped cloth pieces cut out from cloth A or cloth B were fixed by sewing work. In a manufacture of an uncoated air bag according to the present invention, it is effectual for the purpose of elimination of sewing work step to the utmost that a separately prepared reinforcing cloth piece is bonded by adhesion. Specifications of reinforcing cloth piece (5) and the number of the reinforcing cloth may be determined in accordance with the output of the gas generator (operating gas pressure and temperature) and the shape of an air bag and the like. Use of a single layer reinforcing cloth is preferred for simplifying the adhesion work step. It is preferable that the reinforcing cloth is selected from a woven cloth, knitted cloth or a laminate thereof of which a strength at break is one to three times greater than that of cloths A or B.

For bonding a reinforcing cloth piece, adhesion is required to produce an excellent bond between cloth B and reinforcing cloth piece (5) in both initial bonding strength and long term bond durability. Examples of such adhesives include heat curable compounds such as epoxy resins, polyurethane compounds, polyisocyanate compounds, polyamide compounds, polyacrylics, silicones, phenol compounds, polyimides; moisture curable hot meltable compounds (silicones, polyurethens for examples); ultraviolet curable compounds (for example, silicones); electron radiation curable compounds; and rubber based adhesive or rubber cement. These adhesives can be used singly or in a compounded mixture. Silicone adhesives are especially effective in practice for the present invention since the adhesives can produce very firm bonds sustaining bonding strength after a long term aging under a dry heat or wet heat, in addition to a high initial bond strength. Adhesives can contain additives for improvement in additional properties, for examples heat resistance, anti-aging characteristic, acid-proof, aging proof characteristics; accelerated curing or retarded curing.

Amount of adhesive coating can be optionally determined, in accordance with a bonding strength required, the characteristics of the adhesive and a external surface condition of the air bag material, at between 100–300 g/m$^2$, preferably 150–250 g/m$^2$. Application of adhesives can be made by conventional method including coating method, printing method, transferring method and extruding method. Adhesive can be applied in a form of sheet or film. In addition to aforementioned curing method, adhesive bonding can be carried out by heat pressing, steam pressing, high-frequency heating and the like as well. In case where a heat curable silicon adhesive is used, adhesive bonding can be carried out, with use of heat pressing means, at a temperature between 140°–190° C. under a pressure of 0.1 kgf/cm$^2$–0.6 kgf/cm$^2$ for a period of 0.25 min–2.0 min by choosing these conditions in accordance with the specifications of reinforcing cloth piece, area 2' and a selected adhesive.

In the following, various examples in accordance with the invention as well as comparatives will be explained. Before explaining the examples, various test and measuring method for evaluations of the air bag will be described.

(1) Measurement of gas permeability of a fabric

Figure 13:
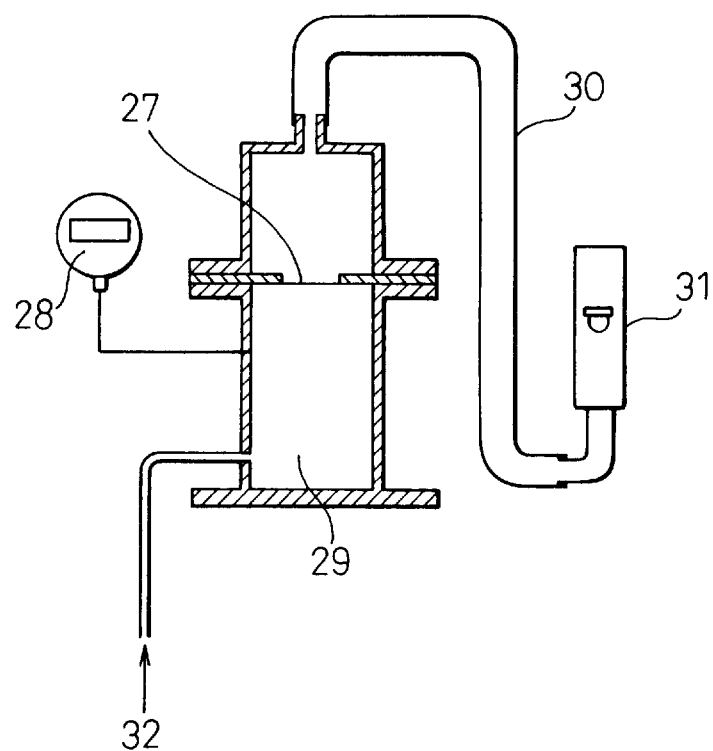
FIG. 13 illustrates a measuring apparatus of gas permeability of a base fabric or cloth.

With use of an apparatus as shown in FIG. 13, the gas permeability of a fabric is measured at 19.6 kPa. A test specimen of a fabric (27) is set fixedly in the measuring hollow cylinder (29) into which a high pressure air is introduced from the bottom side through a decompression valve. The air passes across the fabric and then is discharged via a flow meter 31. The area of the fabric 27 across which the air passes is 10.46 cm$^2$ (a diameter of 3.65 cm). Volume of the air which stationarily flows at 19.6 kPa indicated on the pressure gauge 28 is read by flow meter 31, and the permeated air volume per unit area (q) of the base fabric 27, as expressed in terms of cc/cm$^2$/sec, is obtained.

(2) Measurement of permeated gas volume of an air bag

Figure 12:
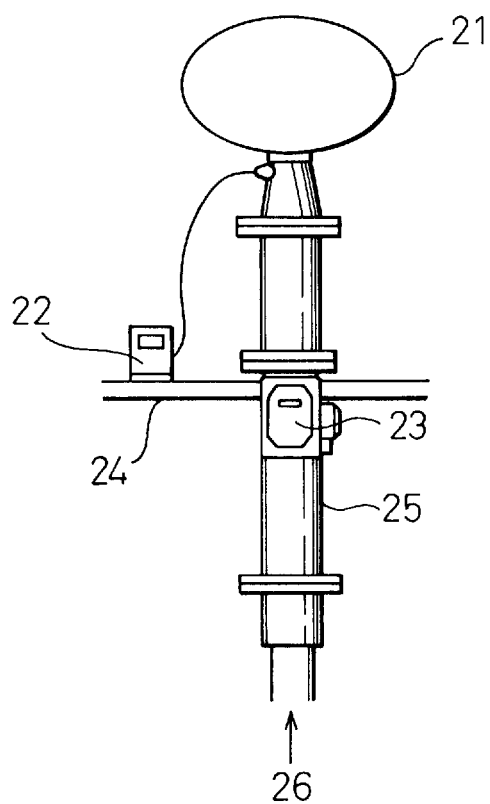
FIG. 12 illustrates a measuring apparatus for gas permeability of an air bag.

Discharged gas volume (Q) from the whole body of an air bag (volume of gas flowing out from the air bag) is measured by using an apparatus shown in FIG. 12. Air (26) is sent upward from the bottom of the apparatus by a blower (26) so as to be discharged from the air bag which is set fixedly at the top of the apparatus. A flow rate of the air flowing stationarily at a pressure of 1.96 kPa indicated on a pressure gauge (22) is read on flow meter (23) to obtain a gas permeation volume Q (m$^3$/min) of the air bag.

(3) Measurement of maximum internal pressure p of an air bag

An air bag module is prepared by assembling a gas generator manufactured by Morton International Inc. (Type IV gas generator for driver's seat air bag; Type D gas generator for passenger's seat air bag), a metal retainer, resin-made air bag casing and an air bag. The module is preheated at a temperature of 85° C. for four hours so that air bag deployment test at elevated temperature (A) is carried out. Maximum internal pressure in an air bag is measured at the moment when an air bag deployment test is carried out.

(4) Inspection of damage incurred by a tested air bag

Observations are made on the damage resulting from the deployment test at an elevated temperature (A) in measurement (3). The evaluation includes, in part, damage resulting from a more severe deployment test at an elevated temperature (B) in which a module is preheated for four hours at 100° C.

Figure 14A:
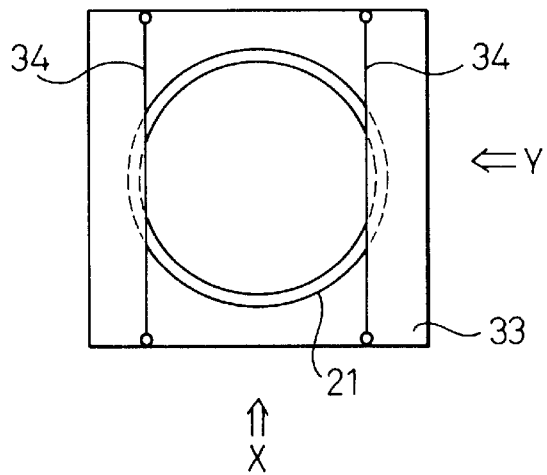
FIG. 14(A), FIG. 14(B) and FIG. 14(C) are illustrations of the air deployment testing apparatus.
Figure 14B:
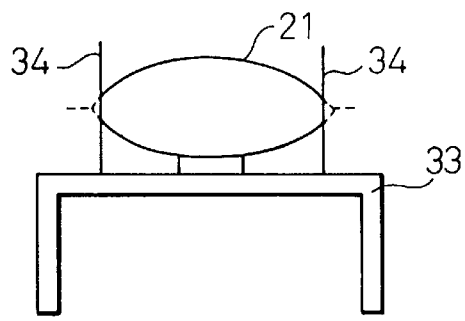
Figure 14C:
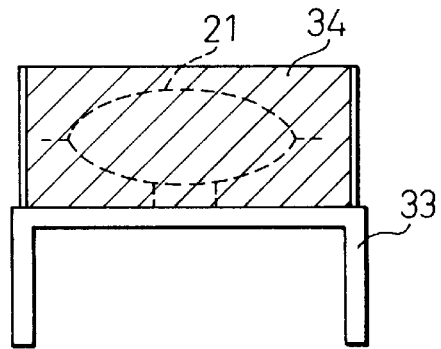

(5) Evaluation of stiffness (resiliency) of the cicumferential outer periphery cut end of an air bag Observations are made for rating the damage incurred by silicon rubber membranes at the moment of the deployment test at an elevated temperature in the aforesaid measurement (3) using the devices as shown in FIGS. 14(A), 14(B) and 14(C). FIGS. 14(A), 14(B) and 14(C) show schematically the states of the air bag at the maximum inflation in the deployment test.

Two pieces of silicon rubber membrane (thickness 0.5 mm; tensile strength 3.6 MPa; maximum elongation 86%; width 500 mm; height 300 mm) are perpendicularly placed with the respective ends fixed to the posts on the frame 33 for deploying an air bag. The two pieces of membranes are placed so that they are able to touch with the cut edge of the circumferential outer periphery of one layer bind weave band of the air bag when the air bag is deployed. For an example, the two pieces of membranes are placed separately 500–550 mm apart from each other when the inflated air bag has a diameter of 600 mm in the plane direction of the inflated air bag. An air bag module preheated at a prescribed temperature is placed midway between the two pieces of silicon membranes on the flame 33, and the gas generator is ignited so as to inflate the air bag in less than one minute. After the deployment test has completed, the silicon membranes are examined for occurrence of damage caused by the inflation of the air bag. In the case where a rupture of greater than 1 mm long is found in the silicon membranes, the cutting end edge of the circumferential weave band too stiff and is rated as having a high possibility of the injuring the vehicle occupant from abrasion. Other cases are rated as having no problems.

(6) Measurement of height of a folded air bag

An air bag is folded in the same manner as it is assembled in a module and the folded air bag is held between two pieces of glass plates. After a weight weighing 2 kilograms is placed on the top surface to the upper glass plate for 5 minutes, the distance of the space held between the opposing glass plates is measured. Evaluation is made on an air bag for driver's sheet (or one for the passenger's sheet) by referring to a ratio of the distance relative to that of the air bag with a silicon rubber coating of 50 g/m$^2$ assuming the height of the latter being 100.

EXAMPLE 1

With use of 420 denier/140 filaments yarn of nylon 66, a circular shaped hollow weave air bag for driver's seat having a weave density of 51 ends and 51 picks/inch was woven on a rapier loom equipped with a jacquard device. Cloth A which faces with the vehicle occupant side (2) of the hollow of the air bag is woven in a plain weave, and cloth (B) which is placed on the bottom side (2') is woven in a rip stop weave formed by weaving a plain weave in which doubled yarns (2 ply yarns) are incorporated (inserted) at an interval of a half inch as part of the warp and weft yarns. The one layer bind weave band (3) is woven in a basket weave having the weave repeat diagram shown in FIG. 10(B) (outer periphery margin portion (11) was omitted). The fabric was scoured and treated with a heat setting treatment to obtain a base fabric for making an uncoated air bag.

From this base fabric, a circular-shaped air bag was prepared by cutting out along the outer periphery of the one layer bind weave band (3) by means of hot knife for fuse-cutting. The obtained air bag has an inner diameter of 710 mm. Width of the circumferential one layer bind weave band of the air bag was 9 mm. The weave density of the portion of area as designated 2, 2' was 53 ends and 53 picks/inch.

In the mean time, an annular shaped a reinforcing fabric piece (5) having a diameter of 200 mm separately prepared, was adhesively bonded in the central portion of cloth B and the opening 6 having a diameter of 100 mm for attachment of the gas generator was formed to make an air bag ready for use with no turning inside out work step. The reinforcing fabric piece was prepared by cutting out of a plain weave fabric of 1,260 denier/210 filaments yarn of nylon 66 (a weave density of 29 ends and 29 picks/inch for both warp and weft) which was prepared by weaving, scouring and heat setting.

The adhesive bond of the reinforcing fabric piece was formed by applying a silicon adhesive coating of 200 g/m$^2$ followed by curing through a pressing machine at a temperature of 160° C. for one minutes.

The obtained air bags were evaluated in accordance with the aforementioned test method (1)–(6), and results of the evaluations are shown in Table 1.

It was found that characteristics of the obtained air bag included light weight, and minimized thickness. No problem was observed in the deployment test at elevated temperature. Further, no questionable damage was observed over the surface of silicon rubber membrane which had touched the circumferential end of the air bags when the air bag was inflated. The bag had sufficient characteristics to protect the vehicle occupant.

EXAMPLE 2

In place of nylon 66 filaments yarn of 420 denier/140 f in Example 1, nylon 66 yarn of 210 denier/105 f was woven on a loom equipped with a jacquard device into a plain weave at a weave density of 68 ends and 68 picks/inch. The weave for the cloth A was a plain fabric. The cloth B was woven in a rip stop weave in which double yarn (2 plied yarn) were incorporated in a plain weave structure at ½ inch interval. The woven fabric was scoured and heat set to obtain a base hollow weave fabric for making an uncoated hollow weave air bag. The base fabric has a weave construction of a yarn density of 72 ends and 72 picks/inch.

An air bag is prepared from the base fabric in the same manner and conditions as described in Example 1 excepting those weave conditions as mentioned above. The characteristics of the air bag obtained are shown in Table 1. The bag was a light weight one and the thickness of the folded air bag was small. In the deployment test at an elevated temperature (A), it was observed that the air bag created no problem. It was concluded that the air bag exhibits appropriate characteristics required for an apparatus for protection of the vehicle occupant.

EXAMPLE 3

Figures 10A, 10B, 10C, 10D:
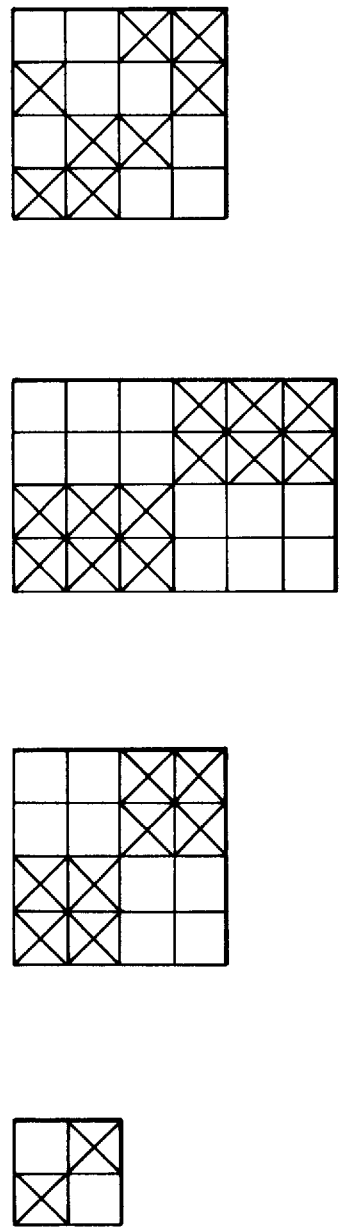
FIG. 10(A) illustrates a weave construction forming cloth A.
FIG. 10(B) and FIG. 10(C) illustrate examples of a weave constructions making up a single layer bind weave band portion.
FIG. 10(D) illustrates an example of a weave construction for forming a vent filter portion.

Using a nylon 66 filaments yarn of 420 denier/140 f, a circular shaped hollow weave air bag for the driver's seat was woven at a weave density of 51 ends and 51 picks/inch on a loom equipped with jacquard device. The cloths A and B constituting the air bag were woven in a plain weave. Fan-shaped woven-in vent filter portions (4) were provided in the cloth B as shown in FIG. 3(D). The vent filter portion was of a modified weft rib weave as illustrated in FIG. 10(D), of which the total area was 830 $cm^2$.

The one layer bind weave band (3) and the inside diameter of the air bag were of the same size as those in Example 1. The fabric was scoured and was subjected to a heat setting-treatment to obtain an uncoated hollow weave base fabric having a weave density of 53 ends and 53 picks/inch. The gas permeability of the woven-in vent filter area in the base fabric was found to be 163/$cm^2$/sec (at a pressure of 19.6 kPa).

The fabric was subsequently cut along the outer periphery of the one layer binding weave band (3) by means of a fuse cutting device. The cut out fabric piece, on the cloth B side, was provided with a circular ring shaped reinforcing cloth piece (5) by adhesive bonding, and the cloth B was further provided with a opening 6 having a diameter of 100 mmφ for attachment of the gas generator to form an air bag which can be readily used without a turning inside-out work step. The results of evaluation of characteristics of the air bag are shown in Table 1.

A light weight air bag was obtained. The bag was foldable and thin. In the deployment test at elevated temperature (A), it was found that the air bag created no problem.

EXAMPLE 4

In place of the reinforcement structure for the opening (6) provided in the central part of cloth (B) for attachment of the gas generator in Example 3, the reinforcing area (7) was formed in a portion of cloth B in which the same yarn used in cloth B as reinforcing yarn, was woven into the weave of cloth B over a width of 20 cm long in the warp and weft directions with the same weaving yarn density as reinforcing yarn.

Further, four joining part each having a length of 100 mm were formed as shown in FIG. 7 by incorporating binding yarns in part of warp and weft yarns so as to join cloths A and B in close contact.

The obtained fabric was cut along the outer periphery of the one layer bind weave band (3) in the same manner as in Example 1, and the opening having a diameter of 100 mm for attachment of the gas generator was formed in the central portion of the cloth B of the cut out fabric to obtain an air bag which is ready for use without a turning inside-out work step.

Results of evaluations of the obtained air bag are summarized in Table 1. The bag is light weight and thin when in a folded state. In the deployment test at elevated temperature, it was observed that the air bag created no problem. When the air bag was inflated, the protruding energy of the air bag at the start of its deployment was absorbed by the breakage of binding yarns by which cloths A and B had been joined together so that the protrusion of the air bag was reduced. The air bag was found satisfactory to protect a vehicle occupant.

In a more severe evaluation test, in a deployment test at an elevated temperature (B) in which a module of the air bag incorporated with the same gas generator was preheated at 100° C. for four hours, it was, however, confirmed that a slight fusion was found in the vent filter portions.

EXAMPLE 5

As the reinforcement structure for the opening (6) provided in the central portion of the cloth B for attachment of the gas generator in Example 3, the reinforcing area 7 was formed over the corresponding portion covering a width of 20 cm in both the warp and weft directions by weaving nylon 66 filamentary yarns (210 d/35 f) as reinforcing yarn in the same weave density as that in the cloth B. As the reinforcing fabric for adhesive bonding, a plain weave fabric (28 ends/inch, 28 picks/inch) was separately prepared by weaving nylon 66 filamentary yarn (840 d/140 f), scouring and heat setting. An air bag was fabricated with use of the other remaining conditions in accordance with those described in Example 3.

The results of evaluations of the obtained air bag are tabulated in Table 1. The bag had a light weight and the thickness of the folded air bag was small. In the deployment test at the elevated temperature (A), it was found that the air bag created no problem.

EXAMPLE 6

Figure 8:
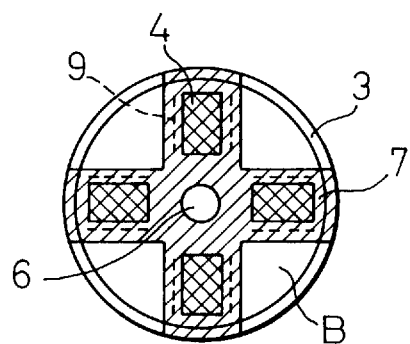
FIG. 8 shows a plan view of a hollow weave air bag in which cloth B is provided with a cross shaped reinforcing weave portion formed by incorporation of additional reinforcing yarn, vent filter portions located within the area of said reinforcing weave portion, and binding seams joining cloths A and B in part in close contact on both sides of the respective vent filter portions.

In place of the vent filter portions in Example 4, four rectangular shaped vent filter portions of which each side was 145 mm long were provided within the area of the reinforcement weave portion (7) as shown in FIG. 8. On both sides of the respective vent filter portion, joining portions (9) were provided in the form of a stitched seam running 100 mm long of two joining yarn by which the cloth A and cloth B are joined together in close contact. The joining portions were disposed at 8 places in total. Further, the one layer bind weave band (3) was made of three continuously connected different weave bands consisting of the inside (3a), the outside (3b) and outermost circumferential periphery margin band (11). The inside (3a) was a woven band 3 mm wide of a weave as shown in FIG. 10(B). The outside (3b) was a ⅔ fancy basket weave band having a width of 12 mm as shown in FIG. 10(C). The outermost periphery band (11) was formed by two separate woven layer of a basket weave with a density of 53 ends and 53 picks/inch. The fabric was cut along the outer periphery of the outmost periphery band (11) by means of a laser cutting device. Except for the conditions described above, an air bag was made in accordance with the manner described in Example 4.

The obtained air bag was tested and the results are tabulated in Table 1.

The bag had a light weight and the thickness of the folded air bag was small. In the deployment test at elevated temperature (A) of the air bag, it was found that no questionable characteristics were observed.

For a more severe evaluation, the deployment test at an elevated temperature (B) was performed in which a module of the air bag incorporated with the same gas generator was preheated at 100° C. for four hours, and it was found that the air bag did not suffer from any damage such as, for example, incidence of fusion in the vent filter portions.

EXAMPLE 7

In accordance with all the conditions in Example 6 excepting that the stitching yarns for joining the cloth A to cloth B at close contact was eliminated, a hollow weave fabric for making an uncoated air bag was prepared by a series of fabric making steps including weaving, scouring and a heat-setting treatment. The obtained hollow weave fabric was cut along the outer periphery margin portion (11) by means of a laser cutting device. With use of sewing threads, 420 denier thread for the needle thread and 1260 denier thread for the bobbin thread, the cut out piece was sewn so as to join the cloth A to the cloth B together at a close contact so that four joining portions of 100 mm long with four stitch lines were formed at four places as illustrated in FIG. 7, and thereby an air bag was prepared. The other conditions necessary for making the air bag were applied in accord with Example 6.

The results of evaluations of the air bag are summarized in Table 1. It was observed that the air bag exhibited characteristics similar to those observed in Example 6.

EXAMPLE 8

In place of using binding yarns for joining cloth A with cloth B in a close contact in Example 6, 40 ends of nylon 66 undrawn yarn (4000 d/140 f) were incorporated into the weave structure for providing with weave-in straps formed by linking yarns which connected the cloths A with the cloth B as indicated in FIG. 6. The length of the linking yarn between cloths A and B was 200 mm. An air bag was produced using the same conditions as described in Example 6 except the above.

Results of evaluations on the obtained air bag are tabulated in Table 1. The bag was of a light weight and the thickness of the folded air bag was small. In the deployment test at elevated temperature (A) of the air bag, it was found that the straps of undrawn yarns were elongated so that the energy of was absorbed at the initiation of inflation of the air bag, and thereby enabling prevention of an initial abrupt forward bulging of the air bag.

EXAMPLE 9

In place of forming the weave-in straps of undrawn yarns in Example 8, similar straps were provided by sewing. The conditions of Example 8 other than the above were employed for making the air bag in this Example. The results of tests on the obtained air bag are summarized in Table 1. The characteristics of the air bag was similar to those of the air bag in Example 8.

EXAMPLE 10

In Example 1, the cloths A and B were woven from polyester filamentary yarn of 500 d/240 f. The woven fabric was scoured and then subjected to a heat setting treatment to obtain a finished fabric having a weave density of 51 ends and 51 picks/inch. Except for the one layer stitch weave band (3) which was made of the same structure as in Example 6, an air bag was produced in the same manner as described in Example 1.

The results of evaluations of the air bag are given in Table 1. The characteristics of the air bag were similar to those of Example 1.

EXAMPLE 11

An oval shaped hollow weave air bag as illustrated in FIG. 9 was formed in a similar manner as described in Example 6. The dimensions of the fabric subsequently obtained after scouring and heat setting treatment were 960 mm for the major axis and 720 mm for the minor axis. As the reinforcement for the opening (6) for the attachment of the gas generator which was provided in the central area of the cloth B, the reinforcing weave area (7) was formed by incorporating the reinforcing weave yarns into the weave of the cloth B over a warpwise length of 300 mm and weftwise length of 120 mm in which the identical reinforcing yarn with the cloth B were woven in the same density as in the cloth B. Within the reinforcing weave area (7) of the cloth B, rectangular shaped vent filter portions (4) having an area of 200 mm×260 mm were provided at two places and the other rectangular shaped vent filter portions (4) having an area of 80 mm×260 mm were provided at other two places. There was further provided a rectangular shaped opening having an area of 80 mm(width)×260 mm(length) for attachment of the gas generator at the central portion of the cloth B. The joining portion for joining the cloths A with the cloth B at close contact was omitted. The air bag was made in accordance with the conditions in Example 6 except that the conditions mentioned above were employed.

The results of tests are tabulated in Table 1. The bag was light weight and the folded air bag had a decreased thickness. In the deployment test at elevated temperature (A) of the air bag, no problem was found.

COMPARATIVE EXAMPLE 1

Except that the finished plain weave fabric having a density of 48 ends and 48 picks/inch was prepared by scouring followed by an heat-setting treatment, an air bag was produced in accordance to the conditions as described in Example 3.

The characteristics of the obtained air bag are shown in Table 1. The bag is light and thin in thickness in its folded state. The cover factor of the cloth A was small, since the cloth A exhibited an excessively large gas permeability (qA). An air bag obtained therefrom could not absorb the impact energy of the vehicle occupant at collision, since the internal pressure attainable was low. Accordingly, there was a danger that the steering wheel would hit the vehicle occupant (the driver) in the chest.

COMPARATIVE EXAMPLE 2

A hollow weave type air bag was fabricated in accordance with Example 3 except that the cloths A and B of the finished hollow weave fabric were designed to have a weave density of 58 ends and 55.5 picks/inch by scouring and heat setting treatment, and that the vent filter portion was designed to have an area of 200 cm².

The characteristics of the obtained air bag are tabulated in Table 1. The air bag was heavy in weight. The air bag lacked stowability since the folded air bag was thick. Because of an increased cover factor value of cloth A, the gas permeability of the cloth A became excessively small. In consequence of the smaller gas permeability, the air bag produced therefrom generated an excessively large internal pressure when it was inflated. Accordingly, it was considered that there was a danger that the air bag of this comparative example would rebound or knock the vehicle occupant backward or its inflation. It was, in addition, found that the silicon rubber membrane had been broken for a length of 30 mm at the place of contact with the outer peripheral end of the air bag during the deployment test (A).

COMPARATIVE EXAMPLE 3

A hollow weave type air bag for the passenger's seat was produced in accordance with Example 11 except that the cloths A and B of the finished hollow weave fabric were made of a weave having a density of 49 ends and 49 picks/inch after scouring and heat setting treatment.

The characteristics of the obtained air bag are tabulated in Table 1. Although the cover factor value of the cloth A was appropriately selected, the impact energy of the collision could not be absorbed when a permeating gas volume (Q) of an air bag was too excessive. In consequence, it was considered that there would be a danger that the dash board could hit the vehicle occupant in the chest or the head when the permeating gas volume (Q) of an air bag was too excessive.

COMPARATIVE EXAMPLE 4

A base fabric for making a hollow weave type air bag devoid of vent filter portions was produced in accordance with the conditions described in Example 3 except that the cloths A and B of the hollow weave fabric, after scouring followed by heat setting treatment, were made to have a weave construction having a density of 46 ends and 46 picks/inch.

Silicon rubber coating of 50 g/m² was applied on the surface of the cloth A of the base fabric and the coated fabric was dried. A similar coating was applied on the surface of cloth B of the base fabric as well and dried. The silicon coated base fabric was, then heat-treated at 180° C. for 5 minutes.

From the obtained base fabric, an air bag was cut out in accordance with Example 3 and the cut out air bag piece was provided with the opening (6) for attachment of the gas generator. In addition, a pair of vent holes each having a diameter of 35 mmφ were provided separately at two places which were positioned 180 mm apart from the center of the opening (6) for attachment of the gas generator on the axial line and inclined 45 degrees with reference to the direction of the weaving yarn axis. For reinforcement of the opening for attachment of the gas generator, a ring-shaped reinforcing woven cloth piece having an outside diameter of 200 φmm and an inside diameter of 100 φmm was fixed by adhesive bond. For reinforcement of the vent holes, an annular shaped reinforcing cloth piece having an outside diameter of 70 φmm and an inside diameter of 35 φmm was fixed by adhesive bonding.

The characteristics of the obtained air bag are shown in Table 1. Although the characteristics relating to absorbability of the impact energy such as occurrence of internal pressure in the air bag at inflation was found satisfactory, the air bag of this comparative example could not be light, soft to the touch and compact to the level aimed for in the present invention.

COMPARATIVE EXAMPLE 5

A base fabric for making a hollow weave type air bag without vent filter weave portions and reinforcing yarns for reinforcement of the opening (6) for attachment of the gas generator was produced in accordance with the conditions described in Example 11 except that the cloths A and B of the finished hollow weave fabric after scouring followed by heat setting treatment were made of a weave construction having a density of 46 ends and 46 picks/inch.

Following the above, a coated base fabric was prepared in accordance with Comparative Example 4. An opening (6) for attachment of the gas generator similar to that in Example 11 was provided, and vent holes having a diameter of 70 φmm were equipped at positions similar to those in Comparative Example 4. A reinforcing cloth piece for the opening for attachment of the gas generator had an outer side size of 180 mm×360 mm and inner side size of 80 mm×260 mm. The reinforcing cloth piece for the vent holes had an outer diameter of 150 φmm and an inner side diameter of 70 φmm. These reinforcing cloth pieces were fixed to the respective stated position by adhesive bonding.

The characteristics of the obtained air bag are shown in Table 1. The characteristics relating to absorbability of the impact energy such as occurrence of internal pressure in the air bag at inflation was found satisfactory. However, it was found as in the case of Comparative Example 4, that the air bag of this Example was not light, soft to the touch and compactly stowable as aimed for in the present invention.

TABLE 1

| | weight of bag (g) | thickness of a folded bag (relative ratio) | cloth A cover factor value K | gas permeability qA of a base cloth of cloth A (cc/cm²/sec at pressure of 19.6 kPa) | qB of cloth B (cc/cm³/sec at pressure of 19.6 kPa) | ratio of gas permeabilities of base cloth of cloths A and B (qA/qB) | permeating gas volume Q (m³/min at 19.6 kPa) | S value of a outer periphery margin portion | Deployment characteristics at an elevated temperature (80° C.) maximum internal pressure of a bag P(kPa) | damage to a bag | damage to silicon rubber membrane | Deployment characteristics at an elevated temperature (100° C.) maximum internal pressure of a bag P(kPa) | damage to a bag | damage to silicon rubber membrane |
|---|---|---|---|---|---|---|---|---|---|---|---|---|---|---|
| Example 1 | 212 | 94 | 2172 | 45 | 66 | 1.5 | 3.2 | 26.5 | 43 | none | none | — | — | — |
| 2 | 148 | 92 | 2087 | 92 | 134 | 1.5 | 6.3 | 18.0 | 30 | none | none | — | — | — |
| 3 | 214 | 94 | 2172 | 45 | 45 | 1.0 | 2.0 | 26.5 | 41 | none | none | — | — | — |
| 4 | 223 | 97 | 2172 | 45 | 45 | 1.0 | 2.0 | 26.5 | 40 | none | none | 46 | occurred | none |
| 5 | 219 | 98 | 2172 | 45 | 45 | 1.0 | 2.0 | 26.5 | 41 | none | none | — | — | — |
| 6 | 221 | 97 | 2172 | 45 | 45 | 1.0 | 2.1 | 13.3 | 39 | none | none | 45 | none | none |
| 7 | 222 | 98 | 2172 | 45 | 45 | 1.0 | 2.1 | 13.3 | 39 | none | none | 45 | none | none |
| 8 | 230 | 99 | 2172 | 45 | 45 | 1.0 | 2.1 | 13.3 | 40 | none | none | 46 | none | none |
| 9 | 228 | 99 | 2172 | 45 | 45 | 1.0 | 2.1 | 13.3 | 39 | none | none | 46 | none | none |
| 10 | 245 | 101 | 2281 | 60 | 88 | 1.5 | 4.3 | 24.3 | 40 | none | none | — | — | — |
| 11 | 287 | 94 | 2172 | 45 | 45 | 1.0 | 6.7 | 13.3 | 24 | none | none | — | — | — |
| Comparative Example 1 | 194 | 90 | 1967 | 127 | 127 | 1.0 | 6.7 | 24.0 | 23 | none | none | — | — | — |
| 2 | 237 | 103 | 2326 | 19 | 19 | 1.0 | 0.8 | 28.4 | 45 | none | occurred | — | — | — |
| 3 | 268 | 87 | 2008 | 113 | 113 | 1.0 | 15.2 | 12.3 | 10 | none | none | — | — | — |
| 4 | 235 | 100 | 1885 | — | — | — | 4.2 | 23.0 | 40 | none | none | — | — | — |
| 5 | 322 | 100 | 1885 | — | — | — | 13.9 | 11.5 | 13 | none | none | — | — | — |

INDUSTRIAL APPLICABILITY

An air bag in accordance with the present invention is an uncoated hollow weave air bag specifically characterized as having a light weight, a soft hand and compact stowability. With the substantial elimination of the work required in the sewing process in the current air bag manufacturing, the reliability of the air bag product can be enhanced. In addition, the manufacturing cost of an air bag can be reduced since an uncoated air bag of the present invention can be produced in a simplified manufacturing process. The above mentioned advantage will allow more cars of various types to carry air bag, and the use of air bag's will be promoted. The air bag of the present invention can be used for protection apparatus for vehicle occupant at the moment of collision of vehicle. It can be especially suitable for the air bag for a driver's seat and passenger's seat. It can be suitably used for an air bag apparatus for protection of the rear seat occupant and an air bag for prevention of a collision impact from the lateral side of an automobile. The air bag of the present invention can be used for a protection device in other vehicles such as bicycles, electric trains, boats and air planes.

We claim:

1. An uncoated hollow weave air bag comprising a hollow weave fabric which is composed of two layers of cloths enclosing the hollow of the air bag, the two layers of cloths being joined together around the circumference of the hollow by a one layer bind weave band;

one of the cloths confines said hollow on the side of the air bag which faces the vehicle occupant;

the remaining other cloth confines said hollow on the bottom side of the air bag; and the cloth confining the hollow on the vehicle occupant side of the air bag and said remaining other cloth confining the hollow on the bottom side of the air bag satisfy the relationships as represented below:

[1] the cloth confining the hollow on the vehicle occupant side of the air bag is a plain wave cloth having a cover factor (K) as defined by the following formula, $$2000 \leq K \leq 2,300$$

wherein K=Kt+Kw

Kt=warp yarn (ends/inch)×√denier of a warp yarn

Kw=weft yarn (picks/inch)×√denier of a weft yarn

[2] a gas permeabilities (qA) and (qB) at 19.6 kPa of said cloth confining the hollow on the vehicle occupant side and said remaining other cloth confining said hollow on the bottom side of the air bag have the relation defined below:

qA≦qB wherein qB is the gas permeability of said remaining other cloth confining the hollow on the bottom side of the air bag excluding the gas permeability of a vent hole portion provided in part in said remaining other cloth on the bottom side of the air bag.

2. An uncoated hollow weave air bag according to claim 1, wherein said one layer bind weave band is provided with an outermost circumferential margin band having a stiffness factor value of not greater than 28, said stiffness factor value being represented by the formula below:

$$S=N/(L \times U)$$

wherein, N represents the total number (yarn/inch) of the warp and weft densities of the weave as expressed in terms of 420 denier as converted, L stands for the number of layers of the weave and U stands for the sum total of the warp and weft yarns in the weave repeat.

3. An uncoated hollow weave air bag according to claim 1 or 2, in which said one layer bind weave band is composed of a plain weave or a rib weave, and said plain weave band of the outermost circumferential margin portion is constituted of a more open weave construction than a plain weave.

4. An uncoated hollow weave air bag according to claim 1, in which the cloth confining said hollow on the side of the air bag facing the vehicle occupant and the cloth confining the bottom side of said air bag are linked or connected by inflation limiting yarns by means of either by being woven or being sewn, and said one layer bind weave band is provided with an outermost circumference margin portion having a stiffness factor value of not greater than 28, and said stiffness factor value being represented by the formula below:

$$S=N/(L \times U)$$

wherein, N represents the total number (yarn/inch) of the warp and weft densities for the weave as expressed in terms of 420 denier converted, L stands for the number of layers of the weave, and U stands for the total of the warp and weft yarns in the weave repeat.

5. An uncoated hollow weave air bag according to claim 1 or 2, in which the cloth confining said hollow on the side of the air bag facing the vehicle occupant and the cloth confining the bottom side of said air bag satisfying the following relationship;

[1] a gas permeability at 19.6 kPa of the cloth confining said hollow on the side of the air bag facing the vehicle occupant (qA) is not greater than 100 cc/cm²/sec;

[2] a ratio (qB/qA) of a gas permeability at 19.6 kPa of the cloth confining the bottom side of said air bag qB to qA is $1 \leq qB/qA \leq 2.2$; and

[3] a permeating gas volume (Q) at 1.96 kPa is $1 \leq Q \leq 15$ m³/min.

6. An uncoated hollow weave air bag according to claim 1 or 2, in which the cloth confining said hollow on the bottom is woven in part in a more open meshed construction so as to form a vent filter portion.

7. An uncoated hollow weave air bag according to claim 1 or 2, in which the cloth confining said hollow on the bottom side of said air bag is provided with an opening for attachment of the gas generator.

8. An uncoated hollow weave air bag according to claim 1, in which the cloth confining said hollow on the side of the air bag facing the vehicle occupant and the cloth confining said hollow on the bottom side of said air bag are linked or connected by inflation limiting yarns by either being woven or being sewn, and said one layer bind weave band is provided with the outermost circumference margin portion having a stiffness factor value of not greater than 28, and said stiffness factor value being represented by the formula below:

$$S=N/(L \times U)$$

wherein, N represents the sum total number (yarn/inch) of the warp and weft densities for the weave as expressed in terms of 420 denier converted, L stands for the number of layers of the weave and U stands for the total of the warp and weft yarns in the weave repeat.

9. An uncoated hollow weave air bag according to claim 8, in which the cloth confining said hollow at the bottom is provided with a reinforcing weave, formed by reinforcing yarns which is woven-in around the periphery of said opening for attachment of the gas generator.

10. An uncoated hollow weave air bag according to any one of the claims 1, 4, 8 or 9, wherein the outermost circumference margin portion of said one layer bind weave band is composed of a multilayer weave band or a opened weave band.

11. An uncoated hollow weave air bag according to any one of the claims 1, 2, 4, 8, or 9 wherein the yarn constituting said hollow weave fabric is of nylon 66 fiber or polyethlenetelephthalate fiber yarn.

12. An uncoated hollow weave air bag according to claim 9, in which the cloth confining said hollow on the bottom side of said air bag is provided with a reinforcing weave around the periphery portion of the opening for attachment of the gas generator, said reinforcing weave is woven in a ratio of the sum total value of denier (TD) of the warp and weft yarn denier per unit area of said reinforcing weave to the sum total value of denier (TD') per unit area of the warp and weft yarn denier constituting the weave area where no reinforcing yarns are incorporated is $1.5 \leq TD/TD' \leq 4$, a vent filter portion being provided within the plane area of said reinforcing weave, and said vent filter portion being woven in a more open and more gas permeable weave construction than that of the weave area where no reinforcing yarns are incorporated.

13. An uncoated hollow weave air bag according to claim 9, wherein the cloth confining said hollow on the bottom side of the air bag is provided with a vent filter portion having a more open weave construction, said vent filter being disposed at a position within an area satisfying the following range on the coordinate X-Y (x, Y);

$-a \leq x \leq a$ and $-b \leq y \leq b$ in which X represents the coordinate axis running in the direction parallel to the weft yarns through the geometrical center point of said cloth, Y represents the coordinate axis running in the direction of the warp yarn through said center point of said cloth, 2a represents the total length of said cloth along the X axis, and 2b represents the total length of said cloth along the Y axis.

14. An uncoated hollow weave air bag according to claim 7, wherein a reinforcing cloth piece is adhesively bonded around the circumferential area of said opening for attachment of the gas generator.

15. An uncoated hollow weave air bag according to claim 1, 4, or 8 in which the cloth confining said hollow on the side of the air bag facing the vehicle occupant and the cloth confining said hollow on the bottom side of said air bag are radially joined in part by sewn seams of yarns which are breakable at the moment of said air bag deployment around the opening for attachment of the gas generator so that the impact of the protruding energy of said air bag is absorbed at the moment of deployment of said air bag, and thereby enabling control of the shape of the air bag in the course of inflating.

16. A base fabric for making an air bag which is composed of two layers of cloth in composite joined together around the circumference of a hollow by a one layer bind weave band, one of said layer of cloths being a plain wave fabric having a gas permeability at 19.6 kPa of not greater than 100 cc/cm²/sec and having a cover factor(K) of $2000 \leq K \leq 2,300$ as defined by formula [1], and the remaining other layer of the cloths having a gas permeability at 19.6 kPa of greater than 100 cc/cm$^2$/sec;

$$K = K_t + K_w \qquad [1]$$

and in the formula;

$K_t$ = warp yarn (ends/inch)×√denier of a warp yarn $K_w$ = weft yarn (picks/inch)×√denier of a weft yarn.

17. A base fabric for making an air bag according to claim 15, wherein said one layer bind weave band is provided with a outermost circumference margin band having a stiffness factor value of not greater than 28, and said stiffness factor value being represented by the formula below:

$$S = N/(L \times U)$$

wherein, N represents the total number (yarn/inch) of the warp and weft densities of the weave as expressed in terms of 420 denier converted, L stands for the number of layers of the weave and U stands for the total of the warp and weft yarns in the weave repeat.

18. A fabric for making an air bag according to claim 16, wherein yarn constituting said hollow weave fabric is made from nylon 66 fiber or polyethlenetelephthalate fiber.

* * * * *